(12) United States Patent
Minnich et al.

(10) Patent No.: US 8,092,656 B2
(45) Date of Patent: Jan. 10, 2012

(54) METHOD AND APPARATUS FOR HIGH EFFICIENCY EVAPORATION OPERATION

(75) Inventors: Keith R. Minnich, Pewaukee, WI (US);
Ramkumar Karlupudi, Waukesha, WI (US); Richard M. Schoen, Hartland, WI (US)

(73) Assignee: Aquatech International Corporation, Cannonsburg, PA (US)

( * ) Notice: Subject to any disclaimer, the term of this patent is extended or adjusted under 35 U.S.C. 154(b) by 1075 days.

(21) Appl. No.: 10/531,752

(22) PCT Filed: Oct. 17, 2003
(Under 37 CFR 1.47)

(86) PCT No.: PCT/US03/33066
§ 371 (c)(1),
(2), (4) Date: Jun. 12, 2006

(87) PCT Pub. No.: WO2004/035479
PCT Pub. Date: Apr. 29, 2004

(65) Prior Publication Data
US 2008/0099154 A1    May 1, 2008

Related U.S. Application Data

(60) Provisional application No. 60/419,549, filed on Oct. 18, 2002, provisional application No. 60/419,552, filed on Oct. 18, 2002.

(51) Int. Cl.
*B01D 1/24* (2006.01)
*B01D 3/28* (2006.01)
*C02F 1/08* (2006.01)
*C02F 1/20* (2006.01)
*C02F 1/42* (2006.01)
*C02F 1/66* (2006.01)

(52) U.S. Cl. ....... 203/10; 159/49; 159/901; 159/DIG. 8; 203/12; 203/72; 203/84; 203/88; 203/89; 203/98; 210/639; 210/664; 210/665; 210/681; 210/687; 210/718; 210/737; 210/774; 210/806

(58) Field of Classification Search ................... 159/2.1, 159/24.1, 49, 901, DIG. 8, DIG. 13, DIG. 27, 159/DIG. 28; 203/10, 12, 39, 40, 72, 84, 203/88, 89, 98; 210/634, 639, 660, 664, 210/665, 681, 685, 687, 713, 718, 737, 774, 210/806; 423/659
See application file for complete search history.

(56) References Cited

U.S. PATENT DOCUMENTS 2,807,582 A    9/1957    Applebaum
4,036,749 A  * 7/1977    Anderson ..................... 210/638
(Continued)

*Primary Examiner* — Virginia Manoharan
(74) *Attorney, Agent, or Firm* — Andrus, Sceales, Starke & Sawall, LLP

(57) ABSTRACT

A process for treatment of an aqueous stream to produce a low solute containing distillate stream and a high solute/solids containing blowdown stream utilizing a method to increase the efficiency of an evaporator while providing an essentially scale free environment for the heat transfer surface. Multivalent ions and non-hydroxide alkalinity are removed from aqueous feed streams to very low levels and then the pH is increased preferably to about 9 or higher to increase the ionization of low ionizable constituents in the aqueous solution. In this manner, species such as silica and boron become highly ionized, and their solubility in the concentrated solution that is present in the evaporation equipment is significantly increased. The result of this is high allowable concentration factors and a corresponding increase in the recovery of high quality reusable water with essentially no scaling.

15 Claims, 6 Drawing Sheets

U.S. PATENT DOCUMENTS

| | | | |
|---|---|---|---|
| 4,235,715 A | | 11/1980 | Wiegert |
| 4,323,430 A | | 4/1982 | Glassman et al. |
| 4,698,136 A | * | 10/1987 | El-Allawy ................ 203/11 |
| 4,746,438 A | | 5/1988 | Riggs, Jr. |
| 4,756,888 A | * | 7/1988 | Gallup et al. ............ 75/712 |
| 5,945,170 A | * | 8/1999 | Kozak et al. ............. 427/437 |
| 6,355,145 B1 | * | 3/2002 | Kresnyak et al. ........ 203/1 |
| 6,468,389 B1 | * | 10/2002 | Harris et al. ............ 159/47.1 |
| 6,733,636 B1 | * | 5/2004 | Heins .................... 203/1 |
| 2002/0153319 A1 | * | 10/2002 | Mukhopadhyay ....... 210/652 |
| 2003/0127391 A1 | * | 7/2003 | Craft et al. .............. 210/651 |
| 2004/0050794 A1 | * | 3/2004 | Ahmed et al. ........... 210/681 |

\* cited by examiner

METHOD AND APPARATUS FOR HIGH EFFICIENCY EVAPORATION OPERATION

CROSS-REFERENCE TO RELATED APPLICATIONS

This application is based on and claims priority from provisional patent Application No. 60/419,552 filed on Oct. 18, 2002 and provisional patent Application No. 60/419,549 filed on Oct. 18, 2002.

TECHNICAL FIELD

This process relates generally to a method and to a water evaporation system for the treatment of waters that contain dissolved organic materials and inorganic salts and in particular to a method that results in a non-scaling heat transfer surface. In various embodiments, this process relates to methods for feed water pretreatment that results in higher design concentration factors (higher recovery), an increase of the on-stream availability of the evaporation system, and an essentially scale free environment at the heat transfer surface.

BACKGROUND

In today's world of increased awareness of the environment along with the high costs and regulations that prohibit and/or limit wastewater disposal to publicly owned treatment services or the environment, there is a demand for water treatment equipment that minimizes wastewater, promotes water reuse in the process, and lowers the quantity of fresh water that has to be imported from wells or public water supplies.

The restraints put on many industries, such as steam-electric power plants, nuclear power plants, and oil production companies, have led to adoption of a Zero Liquid Discharge (ZLD) policy in many instances. A facility can achieve ZLD by collecting and recovering most or all of the water from the wastewater. The resulting highly concentrated wastewater, or dry solids, are then held in ponds on site or the dry solids can be transported to a landfill.

A variety of technologies have been developed to recover water from wastewater or to reduce the volume of the wastewater. These technologies have limitations of complexity and susceptibility to interruption of service or failure of components due to corrosion, fouling, or scaling by the wastewater constituents, especially when feed waters vary from foreseen conditions.

A continuing demand exists for a simple and efficient process which can reliably provide water of a desired quality, in equipment that requires a minimum of maintenance. In particular, it would be desirable to improve efficiency of feed water usage, and lower both operating costs and capital costs for high quality water systems as is required for the various industries.

In most water treatment systems for the aforementioned industries, the plant design and operational parameters generally are tied to final concentrations (usually expressed as total dissolved solids, or "TDS"), which are tolerable in selected equipment with respect to the solubility limits of the sparingly soluble species present. In particular, silica, calcium sulfate, barium sulfate, calcium fluoride, and phosphate salts often limit final concentrations achievable or require operation of the system using the so-called seeded slurry design. To avoid scale formation and resulting decreases in heat throughput, the design and operation of an evaporation based water treatment plant must recognize the possibility of silica and other types of scale formation, and must limit water recovery rates and operational practices accordingly. In fact, typical evaporation plant experience has been that a reduction in distillate flow rates requires chemical cleaning of the evaporator at regular intervals. Such cleaning has been typically required because of scaling, particulate fouling, biofouling, or some combination thereof. Because of the cost, inconvenience, and production losses resulting from such cleaning cycles, it would be advantageous to lengthen the time between required chemical cleaning events as long as possible.

It would be desirable to reduce the scaling, fouling, and corrosion tendencies of the feed water to the point where concentration factors could be increased in the design, and where flux rates could be increased, compared to limits of conventional scale control methods used in water evaporation systems. Raising the allowable concentration factors and flux rates, along with lowering the corrosion potential, is always important to the end user as these design points result in a lowering of capital costs.

Present state of the art embodies several different strategies to alleviate the problems associated with scaling and fouling in higher concentration systems.

These include the use of chelating agents, dispersants, solubility promoters, filters, silica precipitators, operating at low concentration factors, and the use of preferential deposition in a seeded slurry of calcium sulfate ($CaSO_4$) crystals. In the preferential deposition method, the low solubility precipitating crystals tend to deposit on the seeds that are suspended in the circulating solution rather than on the heat transfer surface.

Membrane separation processes have also been used to obtain reusable water from wastewaters but they are typically limited to low recovery operations due to fouling/scaling limits, frequent cleanings, and replacement intervals of three years or less due, in part, to the frequent cleanings which can cause them to lose their rejection capability as well as productivity. A newly patented RO technology, HERON™, utilizes softening and high pH operation to obtain recoveries up to 90 percent but has yet to show an extended membrane life comparable to the 20 years expected of an evaporator. This process is also limited in allowable concentration factor attainable due to osmotic pressure limitations, which currently is around about ten percent total dissolved solids.

The prior art methods have the following shortcomings: (a) they rely on anti-scaling additives to prevent scale formation, or (b) they rely on seeding techniques for preferential deposition to minimize scaling of the heat transfer and other surfaces. Preferential deposition, while it works well in some applications, is not the final answer as it cannot be expected to pick up every individual crystal that is precipitating and some invariably end up on the heat transfer surface, or sump walls, where they themselves then act as a seed site for scale buildup. In addition, certain feed waters do not have enough calcium sulfate ($CaSO_4$) in solution to serve as a self-renewing seed slurry. These feed waters then require the use of additional chemical treatment systems to supply the needed calcium (Ca) or sulfate ($SO_4$), or both, needed for this type of scale control method. Further complications inherent to the preferential deposition method are, (1) the need to carefully control the amount and size of seed that is circulating at any given time as too small a seed will cause fouling to occur in the laminar flow portion of the stream and too much seed will result in plugging of areas like water distribution trays, and (2) there is a limit to the concentration factor obtainable when the presence of double salts, such as glauberite ($NaCa(SO_4)_2$) will form scale as the concentration factor is increased.

Thus, for the most part, the prior art methods have one or more of the following shortcomings: (a) they rely on anti-scaling or dispersant additives to prevent scale formation, (b) are subject to scaling, fouling, and a short useful life, (c) they rely on seeding techniques to minimize scale-deposition, or (d) are not able to concentrate beyond 7 or 8 percent TDS. Thus, the advantages of our treatment process, which exploits (a) multi-valent cation removal to non-precipitating residual levels, and (b) efficient dealkalization, to allow extended trouble free evaporator operation at high pH levels, are important and self-evident.

As water is becoming increasingly expensive, or in short supply, or both, it would be desirable to increase the ratio of treated product water to raw water feed in evaporator systems. Therefore, it can be appreciated that it would be desirable to achieve reduced costs of water treatment by enabling water treatment at higher overall concentration factors than is commonly achieved today. Finally, it would be clearly desirable to meet such increasingly difficult water treatment objectives with better system availability and longer run times than is commonly achieved today.

In so far as we are aware, no one heretofore has thought it feasible to operate an evaporator based water treatment system in a scale free environment and at an elevated pH, in continuous, sustainable, long-term operations to produce a high quality water product. The conventional engineering approach has been to design around or battle scale formation, by use of moderate pH, by limiting final concentration factors, by use of chemical additives, or by use of preferential deposition.

In contrast to prior art methods for water treatment, the method described herein uses the essential design philosophy of virtually eliminating any possible occurrence of scaling phenomenon during evaporator operation at the maximum feasible pH, while maintaining the desired concentration factor, and taking the benefit of water recovery that results.

SUMMARY

We have now invented a novel water treatment method that emphasizes feeding an evaporator with an essentially multi-valent cation free water that allows high pH evaporation in a scale free environment, to produce a high quality distillate at greater cycles of concentration.

In a unique feed water treatment process, raw feed waters of suitable chemical composition are preferentially treated with a weak acid cation ion exchange resin, operated in the hydrogen form, to simultaneously remove multi-valent cations and alkalinity. The weak acid cation ion exchange resins can be operated at incoming raw feed water hardness and alkalinity levels well above those that would cause conventional ion exchange systems to fail due to hardness breakthrough.

The preferred treatment train design used in our wastewater treatment plant overcomes a number of important and serious problems. First, the low levels of multi-valent cations, combined with virtual elimination of non-hydroxide alkalinity, substantially eliminates the precipitation of scale forming compounds associated with sulfate, carbonate, or silicate anions. Thus, cleaning requirements are minimized. This is important commercially because it enables a water treatment plant to avoid lost water production, which would otherwise undesirably require increased treatment plant size to accommodate for the lost production during cleaning cycles. Second, the preferred high pH operational conditions enable a high degree of ionization to be achieved in various species which are sparingly ionized at neutral or near neutral pH in aqueous solution, to enable such species to be concentrated to higher levels before precipitation. Third, the method does not have the osmotic pressure limitation of membrane based systems and allows operation and much higher TDS concentrations with resultant higher recovery or water and reduction in final waste quantity. Finally, operation at high pH and heat provides protection against biological contamination, thus preventing undesirable contamination of the distillate stream. At the preferred high operational pH, bacteria and endotoxins are effectively destroyed. In essence, water treatment systems operated according to the process herein normally operate at conditions, which might ordinarily be considered cleaning conditions for conventional evaporation systems.

We have now developed a novel process design for use in the treatment of water. In one embodiment, the process involves treatment of a feed water stream, which is characterized by the presence of (i) multi-valent cations, (ii) alkalinity, and (iii) molecular species which are sparingly ionized when in neutral or near neutral pH aqueous solutions, to produce a low solute containing distillate stream and a high solids containing blowdown stream. The process involves effectively eliminating the tendency of the raw feed water to form scale when the raw feed water is concentrated to the desired concentration factor at a selected pH by removing multi-valent cations from the raw feed water stream and by effecting, in any order, one or more of the following: ,(i) removing alkalinity from the raw feed water stream, (ii) removing dissolved gases whether initially present or created during the multi-valent cation or alkalinity removal steps, or (iii) raising the pH. The pH of the feed water is raised to a selected pH in a range between 9 and 10, or otherwise in excess of 10, and more preferably to about 11 to 12 or somewhat more, until the benefits gained by high ionization of silica and other species is outweighed by the additional cost. The pH increase is accomplished by adding a selected base to the softened and degassed feed stream, preferably by direct injection into the feed stream or alternately into the sump of the evaporator. The pH increase urges the molecular species, which are sparingly ionized when in neutral or near neutral pH toward increased ionization. The pH adjusted feed water is then sent through heat transfer evaporation equipment to produce a concentrated blowdown stream and a low solute containing distillate stream. The evaporation equipment is typically of the falling film type wherein the heat transfer surface is comprised of a number of tubes with evaporation on either the interior or exterior surface, a plurality of plate style with evaporation on the outer surface, or a forced circulation process. It is important that in our process, the evaporation equipment operates in an essentially scale free environment to produce a distillate stream, which is substantially free of the normally undesirable species while operating at an increased efficiency due to increased solubility limits of sparingly soluble salts at an elevated pH.

OBJECTS, ADVANTAGES, AND FEATURES

From the foregoing, it will be apparent that one important and primary object of the present invention resides in the provision of a novel method for treatment of water to reliably and continuously produce, over long operational cycles, a water distillate stream of high quality, suitable for reuse, at a reduced capital and operating cost.

More specifically, an important object of our invention is to provide an evaporation based water treatment method which is capable of avoiding common scaling and fouling problems, so as to reliably provide a method of high quality water generation when operating at increased efficiency on a variety of wastewaters.

Other important but more specific objects of the invention reside in the provision of a method for water treatment as described in the preceding paragraphs which:

allows for the removal of multi-valent cations and alkalinity from a selected feed water to be done in a simple, direct manner;

has high efficiency rates, that is, provide high product water outputs relative to the quantity of feed water input to the water treatment plant;

allows operation at pH above 9, which reduces the concentration of hydrogen ion present in the aqueous solution;

allows operation at higher specific heat transfer rates, which reduces the amount of heat transfer surface required;

allows removal of dissolved oxygen from the aqueous solution;

in conjunction with the preceding objects, the reduction of hydrogen ion and oxygen concentration reduces the corrosiveness of the aqueous solution allowing the use of lower cost materials for most feed waters;

provide lower unit costs to the water treatment plant operator and thus to the water user, than is presently the case;

in conjunction with the just mentioned object, results in less chemical usage than in most water treatment facilities, by virtually eliminating use of some types of heretofore commonly used chemical additives, particularly scale inhibitors or chemicals needed to maintain a seeded slurry, and eliminates expensive physical/chemical scale removal techniques and downtime;

in conjunction with the scale free environment object previously mentioned, results in a lower corrosion potential and allows for lower grade materials of construction in lieu of high alloy materials.

A feature of one embodiment of the present invention is the use of a unique combination of weak acid cation ion exchange with substantially complete hardness and alkalinity removal, and subsequent high pH evaporation operation, thereby enabling the water treatment plant to minimize the percentage of blowdown water.

This results in high overall cycle efficiencies.

Another feature of the present invention is the use of a high pH operation to highly ionize weakly ionizable species such as silica or boron, thus enabling operation with silica or boron concentration limits considerably exceeding the limits of conventional evaporation treatment systems when treating feed waters of comparable chemistry.

Another feature of the present invention is the capability to remove ammonia from the feed stream as a part of the process instead of another separate process. The ammonium ion ($NH_4$) is very soluble in water with a dissociation constant (pKa) value of 9.24. At a pH of 11.2 in the feed stream, a typical process operating point of the present invention, it is over ninety nine percent (99%) dissociated into the ammonia ($NH_3$) ion and can be removed in the degassifier.

Yet, another feature of the present invention is the capability to retrofit existing evaporation plants to operate according to the present process design, to increase capacity without increasing the installed heat transfer surface.

Other important objects, features, and additional advantages of the invention will become apparent to those skilled in the art from the foregoing, and from the detailed description which follows, and from the appended claims, in conjunction with the accompanying drawings.

BRIEF DESCRIPTION OF THE DRAWINGS

All the exemplary embodiments shown herein incorporate the Zero Liquid Discharge (ZLD) concept option as a part of the illustration. Those skilled in the art will recognize that merely minimizing the blowdown stream without the use of a dewatering device may, on certain occasions, also qualify the system as ZLD.

The high efficiency evaporation method is highly site specific wherein individual process steps are customized to fit the specific feed water, arid needs of the customer, at the specific site. For that reason, all possible embodiments of this novel method of water treatment are not illustrated and, as those skilled in the art can appreciate, other illustrative embodiments would merely reflect variations and arrangement of some components without affecting the spirit or concept of this invention.

The same identifier will reference identical features depicted in each of the drawings.

Figure 1:
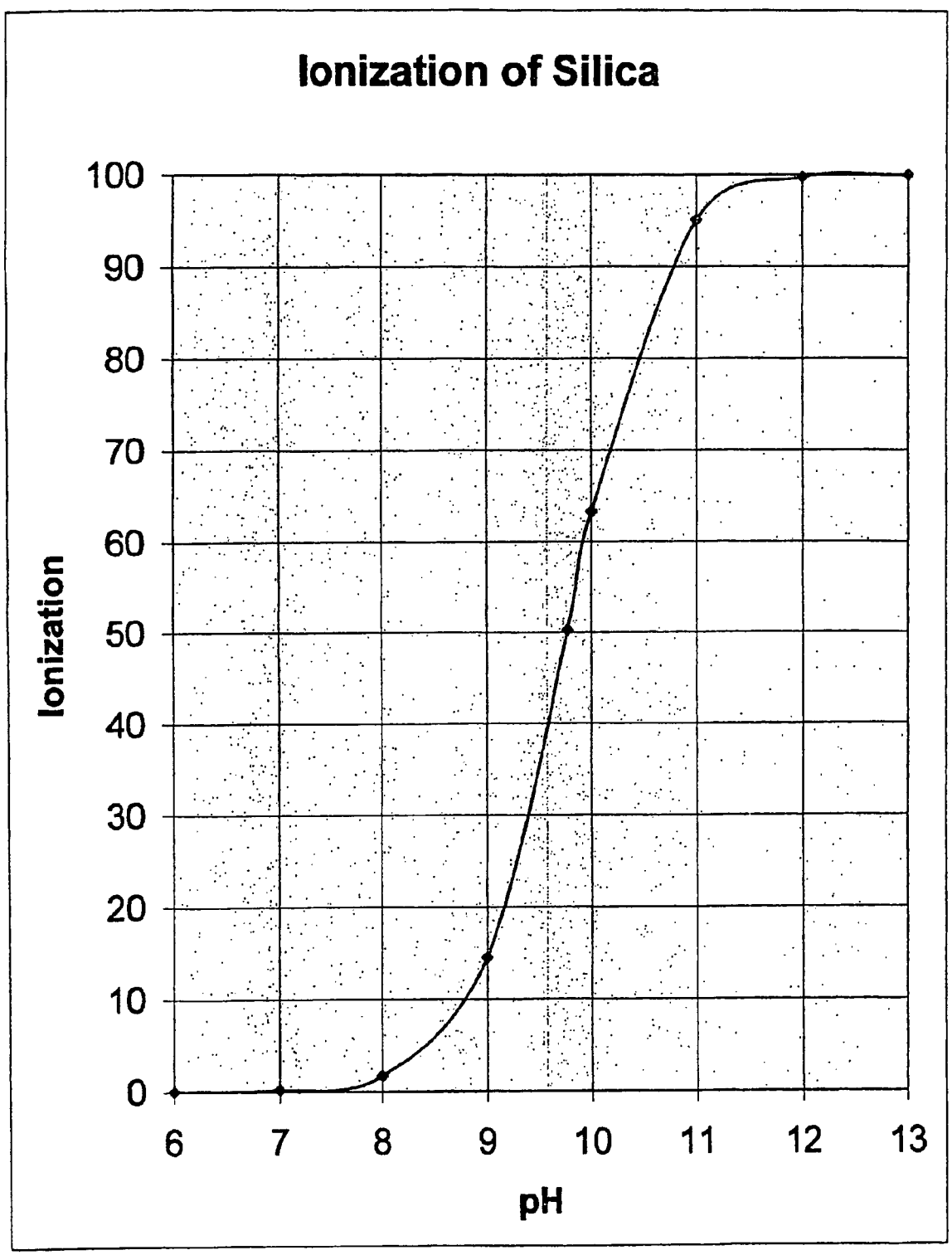
Figure 2:
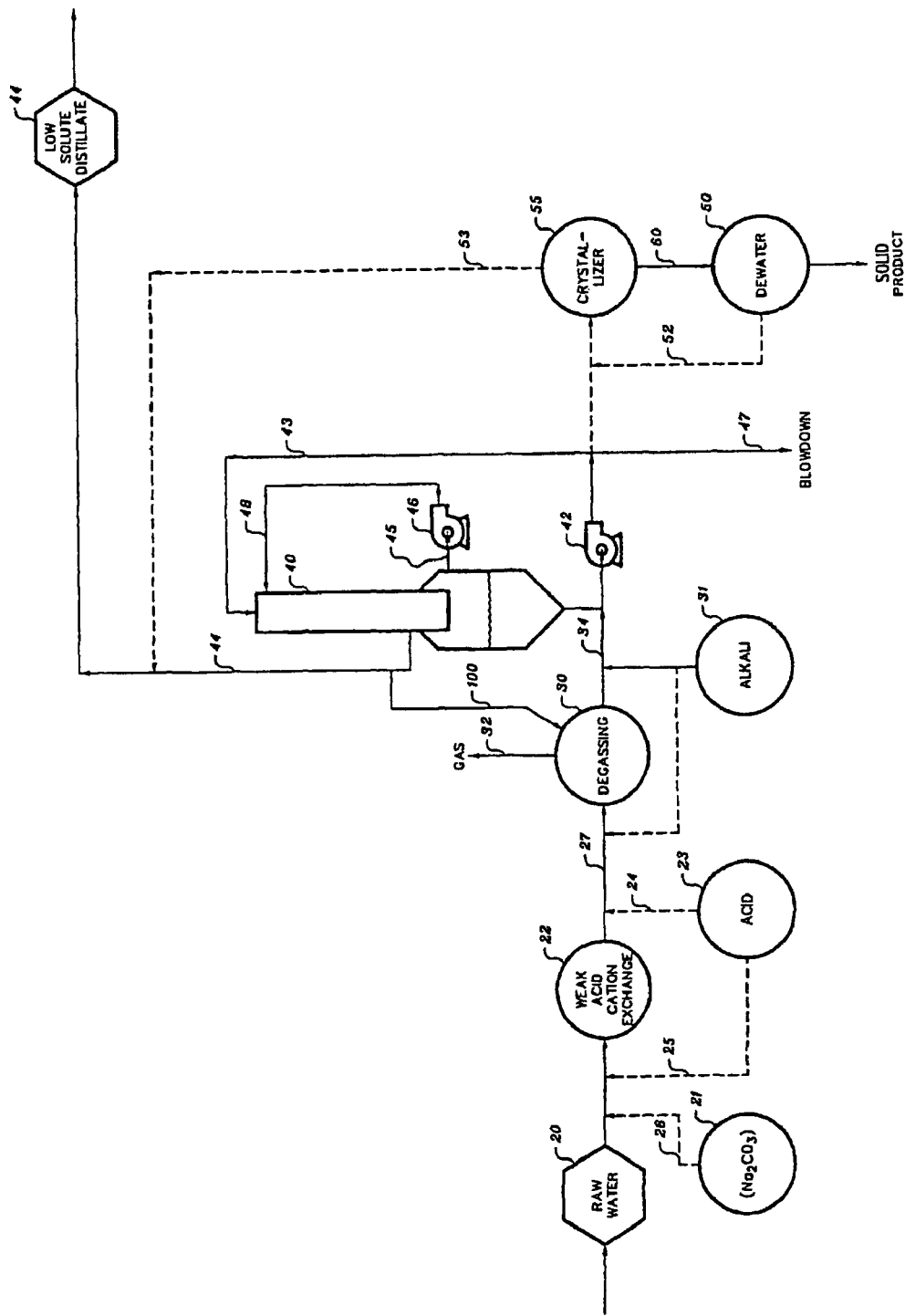
Figure 3:
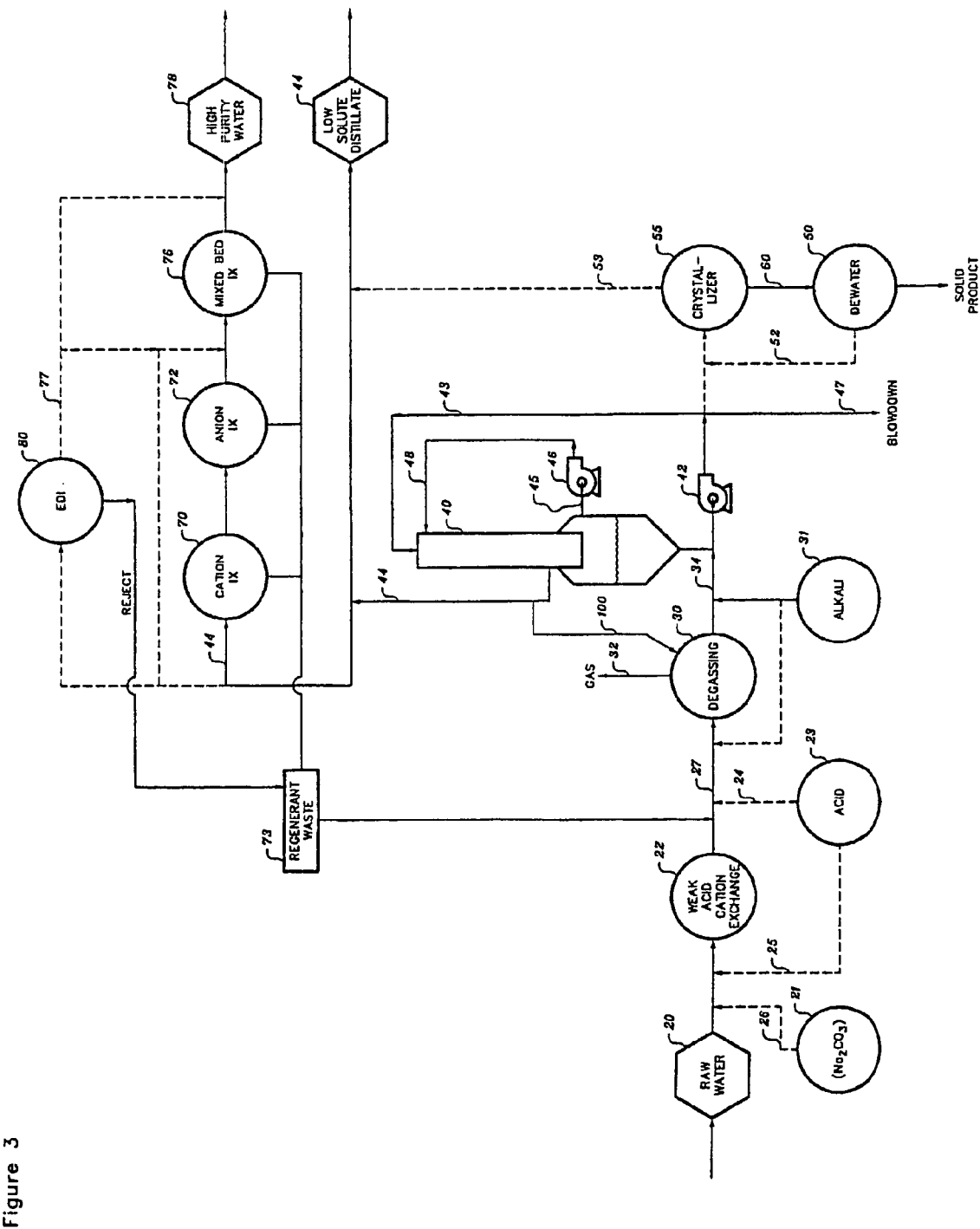
Figure 4:
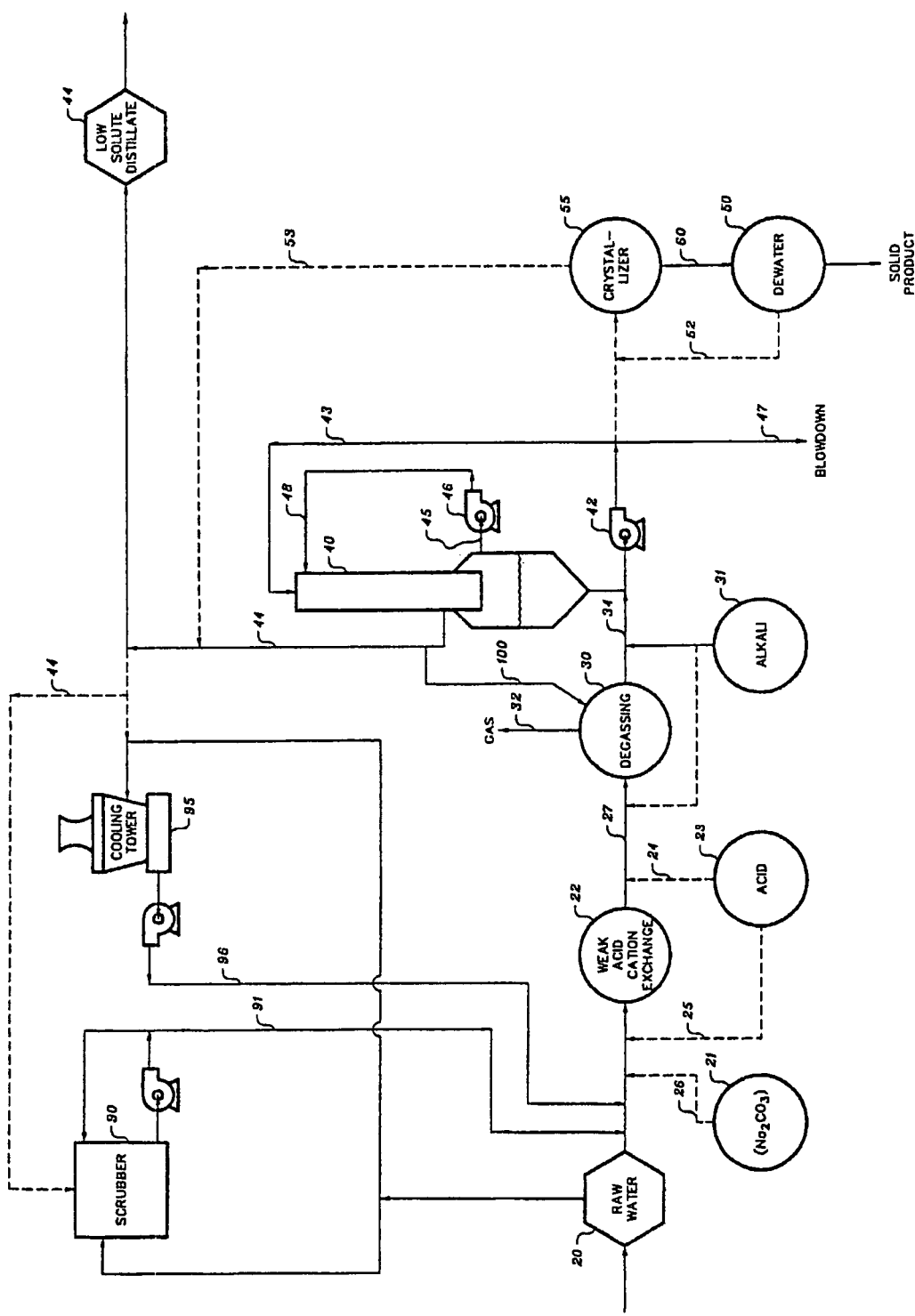
Figure 5:
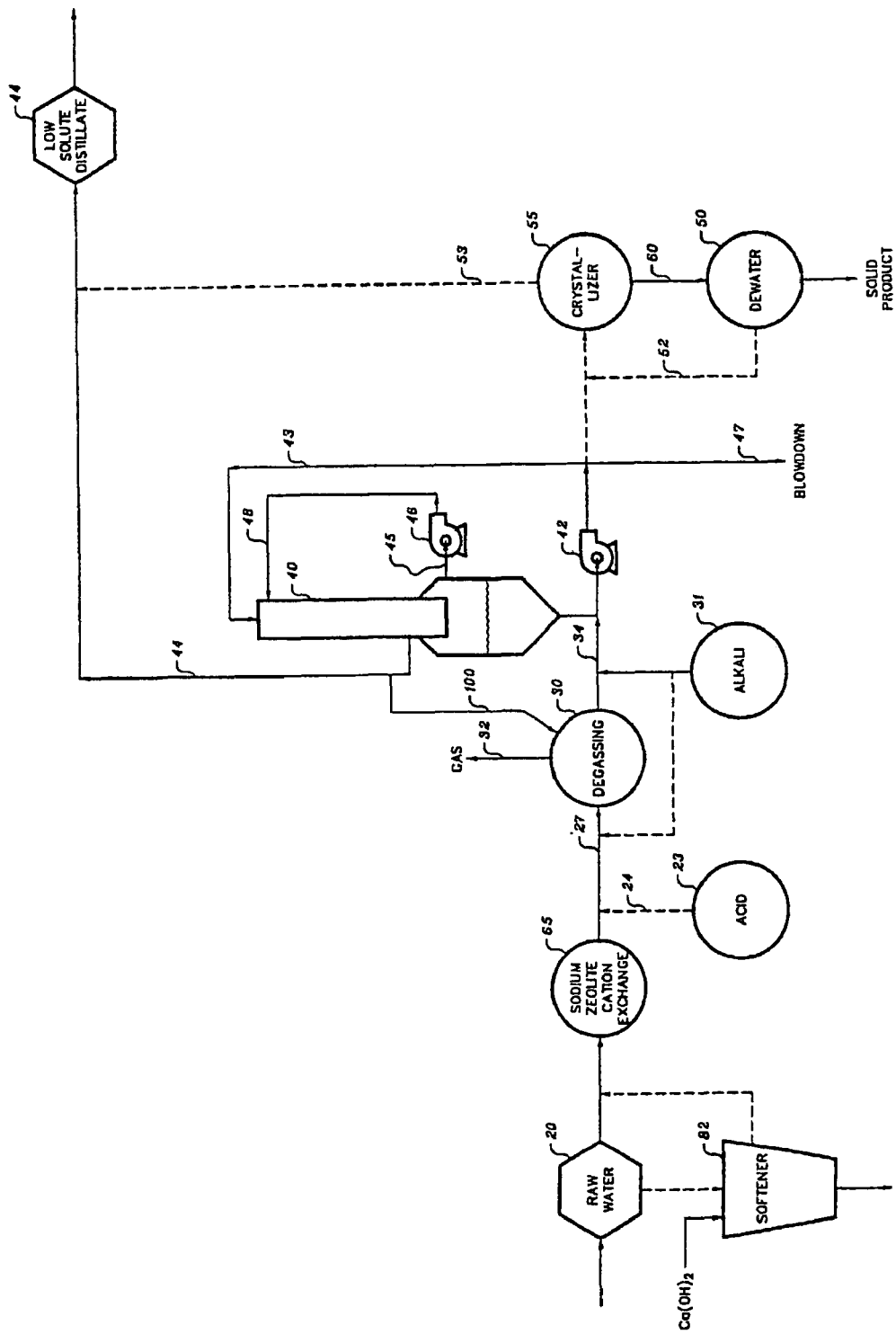
Figure 6:
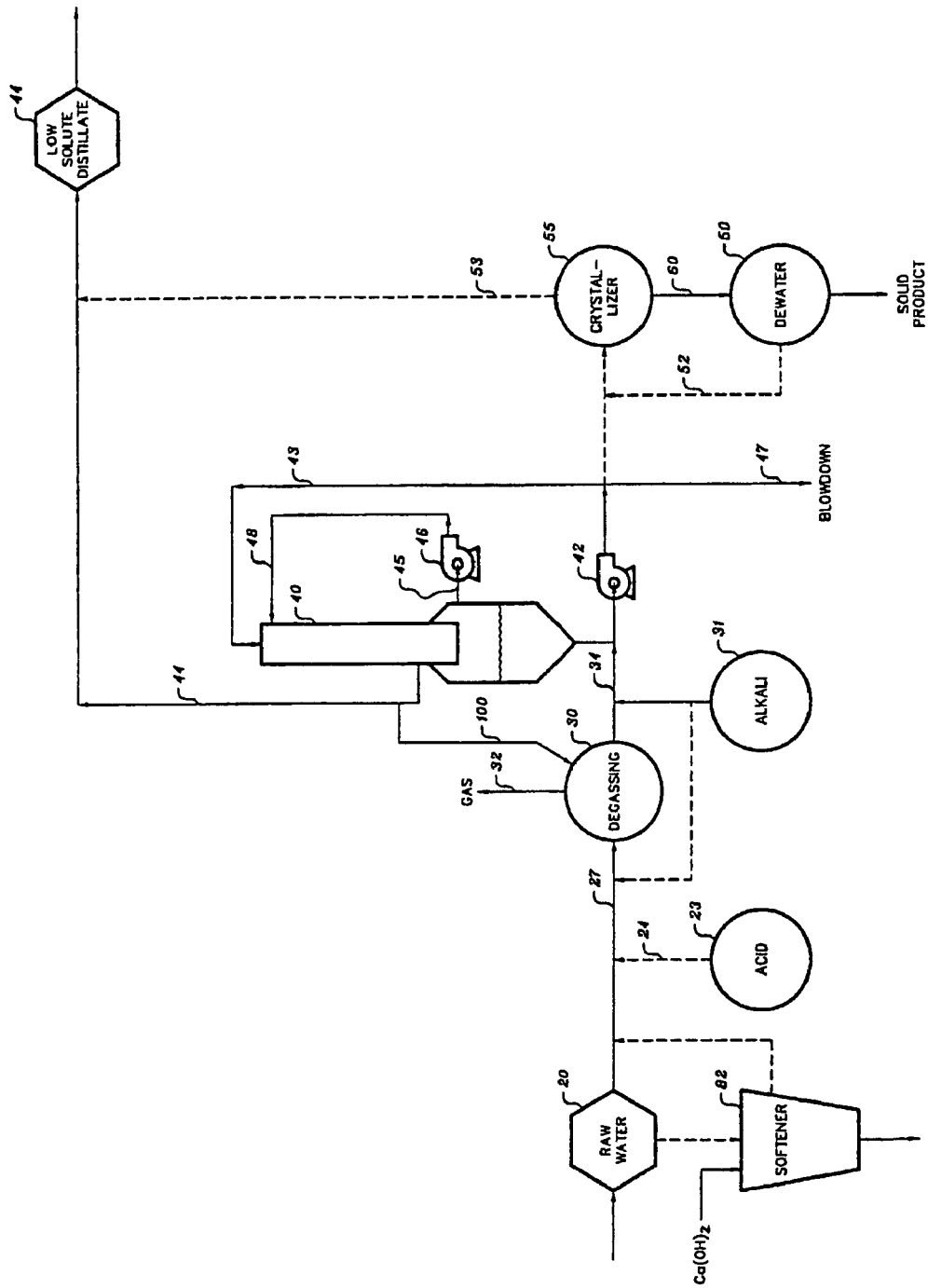

FIG. 1 is a graph illustrating the ionization of silica as a function of pH;

FIG. 2 is a flow diagram illustrating one embodiment of the novel water treatment method disclosed herein to obtain high efficiency evaporation utilizing a weak acid cation exchange system to remove divalent cations and alkalinity associated with hardness in one step;

FIG. 3 is a flow diagram illustrating another embodiment of the novel water treatment method disclosed herein to obtain high efficiency evaporation and high purity distillate simultaneously;

FIG. 4 is a flow diagram illustrating another embodiment of the novel water treatment method disclosed herein to obtain high efficiency evaporation, minimized blowdown, and low solute containing distillate for use as cooling tower or scrubber makeup;

FIG. 5 is a flow diagram illustrating another embodiment of the novel water treatment method disclosed herein showing the arrangement of equipment wherein sodium zeolite softening is sufficient for high efficiency evaporation. The use of an optional lime or lime/soda softener for hardness removal is also depicted; and FIG. 6 is a flow diagram illustrating another embodiment of the novel water treatment method disclosed herein wherein acid addition adequately removes any alkalinity present in the feed stream and where hardness removal, if present, can be optionally accomplished with lime or lime/soda softening.

DETAILED DESCRIPTION

Since many industrial applications of various types generate large quantities of wastewater that is becoming increasingly expensive and regulated, it has become desirable to process it for internal reuse and limit or eliminate discharge into public utilities. Present day state of the art is limited on how much water can be recovered by scale causing ions, such as hardness and silica, which are inherent in these waste streams. The addition of expensive scale inhibiting agents or scale control methods are beneficial but still have their limits of usefulness. We have designed a novel process to overcome these limitations and recover more of the wastewater for reuse than was previously possible by providing a scale free environment in the evaporator. As used herein the term "scale" is intended to encompass not only a thin coating, layer or incrustation (usually rich in sulfate or calcium) that is deposited on a surface, but also particulate fouling, biological fouling, or some combination thereof.

Attributes that characterize the high efficiency evaporator (HEVAP) process design and operation are:
(1) Very high solubility of weak acid anions such as silica.
(2) Very high achievable concentration factors (recovery—ninety percent (99%) or higher recovery can be achieved).
(3) Biological fouling is essentially eliminated.
(4) Particulate fouling is substantially reduced.
(5) Cleaning frequency is substantially reduced.
(6) Addition of scale inhibitors is virtually eliminated.
(7) Corrosion potential is reduced.
(8) Higher heat flux is achievable.
(9) Reduced overall capital cost, compared to conventional evaporation systems.
(10) Reduced overall operating cost, compared to conventional evaporation systems.

The HEVAP evaporation system is highly site-specific. Individual process steps are customized to fit the specific feed water at a specific site. Regardless of the difference in the pretreatment process for different sites, one process parameter is common for all applications, namely that the evaporator system is operated at the highest feasible blowdown pH and that the circulating solution provides a scale free environment at the heat transfer surface.

In order to operate an evaporative system with a pH of at least about 9.0, preferably at least about 10.5, and most preferably between 11 and 12, or above, several process conditions must be met in order to effectively eliminate the potential for scale formation on the heat transfer surface. Some of those process conditions are also necessary for operating an evaporative system at very high concentration factors. Such process conditions are as follows:
(1) The calcium, magnesium, strontium, and barium concentration in the evaporator feed must be substantially absent, preferably to near zero, and most preferably, to essentially zero.
(2) Aluminum, iron, manganese, and other multi-valent cation content including organically bound species, as well as the presence of colloidal particles containing such materials, should be substantially absent, and preferably to near zero.
(3) Buffering anions (specifically bicarbonate, or carbonate, and/or phosphate species) should be reduced to as low of a level as can be practically achieved.
(4) Dissolved and suspended gasses such as oxygen, ammonia, and others should be minimized.

The selection of specific operations and control points, to fulfill the above process condition requirements, is influenced by the characteristics of each specific feed water. The concentration factor needed (or desired for a specific application) also affects the operations and control point criteria as well. FIG. 2 represents a highly effective evaporator unit process sequence.

The first step is to adjust the hardness-to-alkalinity ratio of the feed water, if needed. Optimizing this ratio, which is typically done by alkali addition, makes complete hardness removal feasible in a weak acid cation ion exchange process operated in the hydrogen form as described in the next process step.

The second step in the evaporator process train involves the utilization of a weak acid cation (WAC) resin (e.g. DOWEX.RTM. MAC-3, or Lewatit CNP-80, Amberlite.RTM. IRC-86). Operated in either the hydrogen or sodium form, the WAC resins remove multi-valent cations and, in the hydrogen form removes any alkalinity associated with hardness.

The third step involves pH adjustment by adding acid to the WAC effluent. Acid is added to destroy any alkalinity remaining, after multi-valent cation removal, if any such alkalinity is present.

In a fourth step, the acidified effluent, containing virtually zero alkalinity, is then treated for carbon dioxide removal. This removal can be accomplished in any of various type degasifiers. The degasified feed water stream with multi-valent cation levels below the limits required for scale free operation and essentially zero alkalinity, is then injected with a soluble alkali, preferably for adjusting pH to 9.0 or higher, more preferably 10.5 or higher, and most preferably 11.0 or above.

In other embodiments where ammonia is a concern, a variation of the steps is required. Alkali is added to the feed stream to decrease ammonia solubility at elevated pH prior to removing it as a gas in a degassifier. In applications where both alkalinity and ammonia are present, two degassifiers are required, one for removing any gases such as carbon dioxide at low pH and one for ammonia removal at high pH. In cases where there is no alkalinity due to a very low pH in the feed stream, the ammonia can be removed by injecting alkali prior to a single degassifier after reducing the multi-valent cations to a non-scaling level in the feed stream.

Feed waters utilized for production of reusable water, especially those encountered in wastewater treatment, include the presence of silicon dioxide (also known as silica or $SiO_2$) in one form or another, depending upon pH and the other species present in the water. For evaporator systems, scaling of the heat transfer surface with silica is to be religiously avoided. This is because (a) silica forms a relatively hard scale that reduces productivity of the evaporator, (b) is usually rather difficult to remove, (c) the scale removal process produces undesirable quantities of spent cleaning chemicals, and (d) cleaning cycles result in undesirable and unproductive off-line periods for the equipment. Therefore, regardless of the level of silica in the incoming raw feed water, operation of conventional evaporation processes, without a preferential deposition seeded slurry process, generally involves concentration of $SiO_2$ in the high solids stream to a level not appreciably in excess of 150 ppm of $SiO_2$ (as $SiO_2$). This requires that evaporator systems be operated at lowered concentration factors (recovery rates) to prevent silica concentration in the blowdown stream from exceeding solubility limits. Seeded slurry systems can be taken to concentration factors that surpass the solubility of silica but rely on seed management procedures and are still prone to scaling of the evaporator.

Scaling due to various scale forming compounds, such as calcium sulfate, calcium carbonate, and the like, can be predicted by those of ordinary skill in the art and to whom this specification is directed, by use of the Langelier Saturation Index (LSI) or the Stiff-Davis Index (S&DI), or other available solubility data. Operating parameters, including temperature, pH, distillate and blowdown flow rates, must be properly accounted for, as well as the various species of ions in the raw feed water, and those species added during pretreatment. The Nalco Water Handbook, copyright 1979, by McGraw-Hill details the procedure for use of the indexes.

With reference to FIG. 2, wastewater stream 20 of this invention will typically contain, soluble and insoluble, organic and inorganic components. The inorganic components can be salts such as sodium chloride, sodium sulfate, calcium chloride, calcium carbonate, calcium phosphate, barium chloride, barium sulfate, and other like compounds. Metals such as copper, nickel, lead, zinc, arsenic, iron, cobalt, cadmium, strontium, magnesium, boron, chromium, and the like may also be included. When treating a wastewater stream from an oil refinery, organic components will be present and are typically dissolved and emulsified hydrocarbons such as benzene, toluene, phenol, and the like.

It is commonly understood that the solubility of silica increases with increasing pH, and that silica is quite soluble in high pH aqueous solution. Along with solubility, the degree of ionization of silica also increases with increasing pH. While the increase in silica solubility is not directly proportional to the degree of ionization, the rate of increase in silica solubility is basically proportional to the rate of change in ionization as increased ionization results in the soluble silicate ion being the dominant species. This discrepancy between solubility and ionization is explained by the fact that even undissociated silica exhibits some solubility in aqueous solutions, typically up to about one hundred twenty (120) ppm to one hundred sixty (160) ppm, depending upon temperature and other factors. In comparison, it has been demonstrated that silica solubility at pH 10.5 is in excess of one thousand five hundred (1,500) ppm at ambient temperature; silica is increasingly soluble as temperature and/or pH increases.

Silica is very weakly ionized when in neutral or near neutral aqueous solutions and is generally considered to exist as undissociated (meta/ortho-) silicic acid ($H_4SiO_4$) in most naturally occurring waters with a pH of up to about 8. The dissociation constant (pKa) value for the first stage of dissociation of silica has been reported at approximately 9.7, which indicates that silica is approximately fifty percent (50%) ionized at a pH of 9.7; the other fifty percent (50%) remains as undissociated (ortho) silicic acid at that pH. A graphical representation of the relationship between pH and the percent silica ionization is shown in FIG. 1. Clearly, it would be advantageous, where silica ionization is desired, to operate at a pH in excess of 10, and more preferably, in excess of 11, and yet more preferably, in excess of 12 where all of the silica molecule is present as a soluble silicate ion.

Therefore, increasing the pH of the evaporator operation thus provides the major benefit of increased silica solubility. To gain maximum benefit from silica ionization at high pH, the evaporator system should be operated at a pH as high as possible, Preferably, the evaporator system is operated at a pH of about 10.5 or above, and more preferably, at a pH of 11 or higher. This contrasts with typical evaporator operation practice, where operating pH has been maintained at less than 9 in order to avoid scale formation, particularly silica and carbonate scales.

Referring to FIG. 2, one embodiment of this process for evaporation equipment operation is shown. In this method, raw water 20 is first treated in a weak acid cation (WAC) ion exchange unit 22, where hardness and bicarbonate alkalinity are simultaneously removed. For those cases where raw water 20 hardness is greater than alkalinity, operation of the weak acid cation ion exchange unit 22 must be facilitated by addition of a source of alkalinity 21, such as by addition of an aqueous solution of sodium carbonate ($Na_2CO_3$). Preferably, the WAC unit 22 is operated in the hydrogen form for ease of operation and regeneration. However, it would also work in the sodium form, followed by acid addition. In any case, in the just mentioned case and otherwise optionally where appropriate, acid 23 is added to the effluent 27 from the WAC unit(s) 22 to enhance bicarbonate destruction. Sufficient acid is added to lower the pH where bound carbonates are converted to a free gas carbon dioxide. Then, the carbon dioxide 32 that has been created in the WAC (and/or by acid addition) is removed, along with other non-condensable gasses such as oxygen and nitrogen, preferably in an atmospheric pressure or vacuum/flash degasifier 30. Finally, an alkali 31 (base) is added, preferably by pumped injection of liquid solution, to increase the pH of the feed water 34 to a selected level. Any of a variety of conveniently available and cost effective base products may be used, provided that no appreciable scaling tendency is introduced. Besides use of common sodium hydroxide, other chemicals such as sodium carbonate, potassium hydroxide, or potassium carbonate might be selected. In fact, in certain cases, an organic base, such as a pyridine type compound, may be used effectively to carry out this process.

The pH of the feed water is raised to a selected pH of at least about 9.0, or up to about 10, or preferably to a range between 10 and 11, or otherwise in excess of 11, and more preferably to 12 or more, and most preferably, to 13 or more.

The weak acid cation ("WAC") ion-exchange resins used in the first step of the preferred embodiment of the method defined herein, as illustrated in FIG. 2, are quite efficient in the removal of hardness associated with alkalinity. Such a reaction proceeds as follows:

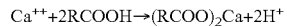

Then, the hydrogen combines with the bicarbonate to form carbonic acid, which when depressurized, forms water and carbon dioxide, as follows:

Regeneration of the resin is accomplished by use of conveniently available and cost effective acid. It is well known by those in the art that regeneration of WAC ion-exchange resins may proceed quite efficiently, at near stoichiometric levels (generally, not more than about one hundred and twenty percent (120%) of ideal levels). Preferably, hydrochloric acid may be used, since in such cases highly soluble calcium chloride would be produced, and the regeneration process would not pose the potential danger of formation of insoluble sulfate precipitates, such as calcium sulfate, even with high strength acids. However, by use of a staged regeneration procedure, i.e., by using a low concentration acid followed by a higher concentration acid, it is possible to reliably utilize other acids, including sulfuric acid ($H_2SO_4$), while still avoiding undesirable precipitates on the resin. In this manner, hardness ions are solubilized to form soluble salts, which are eluted from the resin bed and are typically sewered.

Other polyvalent cations, most commonly iron ($Fe^{++}$/$Fe^{+++}$), magnesium ($Mg^{++}$), barium ($Ba^{++}$), strontium ($Sr^{++}$), aluminum ($Al^{+++}$), and manganese ($Mn^{++}$/$Mn^{++++}$), are also removed by the WAC resin. Since the presence of even very small quantities of hardness or other species of decreasing solubility at increasing pH will result in precipitation of sparingly soluble salts under the process conditions present in our process, care must be taken to prevent precipitation on the heat transfer surface of the substances such as calcium carbonate, calcium hydroxide, magnesium hydroxide, and magnesium silicate. One precaution that should be observed is that both hardness and non-hydroxide forms of alkalinity should be aggressively reduced in the feed water, prior to upward pH adjustment to selected evaporator operating conditions. Once the multi-valent cations and non-hydroxide forms of alkalinity have been removed, then the desired pH increase may be accomplished with any convenient alkali source, such as sodium or potassium alkali. Once this pretreatment has been thoroughly accomplished, then an evaporator system can be safely operated at very high pH levels, in order to take advantage of the aforementioned silica solubility.

The treated and conditioned feed water 34 is directed into the evaporator 40 where it mixes with and dilutes the concentrated high solids stream 43. This stream is recirculated with pump 42 and a small portion is removed as evaporator blowdown 47 on each pass through the evaporator 40. In the evaporator 40 the solutes in the feed water 34 are concentrated by removing water from the diluted recirculating solution 43 as it passes over the heat transfer surface. As depicted in FIG. 2, the evaporator utilizes falling thin film evaporation wherein the recirculated stream 43 is thinly spread across the inner surface of a plurality of heat transfer tubes. A small portion of water is removed from the thin recirculating stream in the form of steam 45 driven by heated, compressed steam 48 which is condensing on the outside of the heat transfer tubes. The water that has been removed, in the form of steam 45, is compressed through the compressor 46, and the compressed steam 48 is condensed on the outer surface of the heat transfer tubes to generate more steam 45, and keep the evaporation process going. The condensing steam 48 is known as distillate or condensate, as is known to those skilled in the art of evaporation, and contains a low level of non-volatile solutes, typically, in some embodiments, less than 10 parts per million (ppm). It should be noted that the use of a tubular falling film evaporator 40 design is provided only for purposes of enabling the reader to understand the evaporation process and is not intended to limit the process to the use of the same. Those familiar with the art will recognize that other designs, such as, for example, a rising film evaporator, or a forced circulation evaporator, or a plate style evaporator may be alternately utilized with the accompanying benefits and/or drawbacks that may be inherent in the alternative designs.

The condensing steam 48 descends by gravity to the bottom of the tubular heat transfer surface and is collected as distillate stream 44. A small portion of the distillate 44 may be sent to the earlier discussed degasser 30 via line 100 for use in mass transfer, i.e., adding heat to the feed water stream 27 to remove non-condensable gasses such as carbon dioxide 32. However, the bulk of the distillate 44 is directed to the terminal point of the evaporator where it is available for use in any process that requires high quality water as a makeup stream. Typical, but not limiting, uses include those shown in the FIG. 4 embodiment of the high efficiency evaporation process in which the distillate can be used as makeup to a cooling tower or scrubber. Other uses would include low-pressure boilers and, in the hydrocarbon recovery field (produced water), as feed water to a once through steam generator (OTSG) that generates steam for injection into oil-bearing formations.

Although the low solute containing distillate 44 produced by the evaporator is relatively pure water, there are instances where a higher purity is required. FIG. 3 depicts an embodiment wherein several different options are shown for obtaining different levels of high purity. In most cases the residual solutes in the distillate stream 44 involve salts other than hardness. In one embodiment, the distillate 44 is passed through a cation ion exchange system 70, followed by an anion ion exchange system 72, and then polished in a mixed bed ion exchange system 76 to produce a very high purity water. The inclusion of all three ion exchange systems is for illustration only and those of ordinary skill in the ion exchange arts and to which this disclosure is directed will recognize that only those ion exchange systems required to meet the requirements for purity will be used. In any event, the ion exchange systems will require regenerant chemicals and that will result in a regeneration waste stream 73 which can be directed to the inlet of the degasifier 30 for further treatment in the evaporator 40. In an alternate embodiment, the removal of residual solutes in the distillate stream 44 can be accomplished by passing the stream through an electrodeionization (EDI) unit 80. The EDI reject is also capable of being recycled to the evaporator by directing it to the inlet of the degasifier 30.

The impact of very low levels of silica, etc., in the relatively pure distillate 44 obtainable by evaporation on the behavior/operation of a post-evaporator ion exchange system is extremely significant. Since the vast majority of post-evaporator ion exchange is regenerated on the basis of either silica or boron breakthrough, a factor of ten reduction in the influent silica/boron content will provide much longer run times between regenerations. Absence of carbon dioxide, as well as bicarbonate in the distillate 44 (due to a high pH, typically at least 10), will also increase on-line time before silica/boron leakage exceeds normal threshold values. Reduction of strongly ionized species concentration in the distillate 44 is of relatively less significance, since most post-evaporator ion exchange is ultimately silica or boron limited.

The just described combination of treatment steps when combined with the novel process described hereinabove produces a water of sufficient quality, and. economic quantity, to be used in high pressure and packaged boilers. Typical users would be the power generation industry and hydrocarbon recovery operations wherein 100% quality steam is utilized for steam flooding applications.

The evaporator blowdown 47 containing the concentrated solutes originally present in the feed water 34 along with any chemicals used to raise the pH and/or regenerate post ion exchange systems can be disposed of by the standard approach used at individual sites. This includes holding on-site in waste evaporation ponds, trucking to a waste site, or injection into deep wells.

Alternatively, the blowdown stream 47 can be directed to a crystallizer 55 that further processes the concentrated stream to recover low solute distillate 53 and a high-suspended solids stream 60. The distillate stream 53 is then combined with the falling film evaporator distillate stream 44 to effect increased recovery of the evaporator feed stream 34. The high-suspended solids containing stream 60 can then be directed to a dewatering device 50, typically a belt filter but alternatively a filter press or even a spray drier. The final product is a dried solid that is suitable for landfill or possibly even reused within the originating process. The two different filter methods generate a high solute/low suspended solids stream 52 that is directed back to the crystallizer 55 for further processing.

In other embodiments, and as suited to meet the particularized needs of a selected raw feed water chemistry, various forms of hardness removal may be utilized, including sodium form strong acid cation exchange 65, followed by acidification (see FIG. 5) or even the use of a lime 82 (or similar lime/soda) softener as an additional pretreatment step to either sodium form strong acid cation exchange 65 or weak acid cation exchange 22 (see FIGS. 2 and 5). The direct injection of lime and sodium carbonate into the feed stream can also be utilized and the resulting precipitate filtered out in a membrane separation process, such as ultrafiltration, as a substitute for the lime/lime soda 82 softener.

For particularly soft waters, the lime or lime/soda softener 82 may be totally inappropriate, and this method may proceed with no softening of the raw water, and only a simple acid 24 feed before degasifying, as can be seen in FIG. 6. On the other hand, where softening is appropriate, some raw feed waters can be appropriately treated for reductions in hardness and alkalinity to a desired extent by softener 82.

In still other embodiments and for a selected feed water, the use of softening membranes for partial removal of hardness may be incorporated into the process as a replacement for sodium zeolite 65 or weak acid cation 22 softening.

In cases where raw water composition is such that sodium zeolite softening is advantageous, as is depicted in FIG. 5, elimination of calcium hardness proceeds as follows:

$$Ca^{+2}+Na_2X \rightarrow CaX+2Na^+$$

Then, bicarbonate alkalinity is converted to carbon dioxide, with a selected acid, in a manner similar to the following:

$$NaHCO_3+HCl \rightarrow NaCl+H_2O+CO_2$$

For those waters where lime softening may be an acceptable or preferred method for initial hardness and alkalinity reduction, the addition of lime to the water reduces calcium and magnesium hardness, and associated bicarbonate alkalinity, as follows:

$$Ca(HCO_3)_2+Ca(OH)_2 \rightarrow 2CaCO_3\downarrow+2H_2O$$

$$Mg(HCO_3)_2+2Ca(OH)_2 \rightarrow Mg(OH)_2\downarrow+2CaCO_3+2H_2O$$

Regardless of the equipment configuration selected for treatment of a particular raw water chemistry, the key process parameters are (a) to remove those cations which, in combination with other species present at high pH, would tend to precipitate sparingly soluble salts on the heat transfer surfaces, and (b) eliminate non-hydroxide alkalinity to the maximum extent feasible, to further protect against precipitation of scales on the heat transfer surfaces when operating at an elevated pH.

FIG. 10 illustrates the use of our novel method of evaporator system operation for cooling tower makeup water or for scrubber makeup water. The evaporator unit 40 and various pretreatment equipment are operated according to the methods set forth hereinabove, to produce a high quality distillate 44. Although the cooling tower 95 and scrubber 90 could be fed with distillate 44, more typically, the cooling tower 95 and scrubber 90, for example in a steam-electric power plant, would be supplied by usual raw water 20 supplies, such as municipal or well water.

Therefore, cooling tower blowdown 96 and scrubber blowdown 91 are typically high in both hardness and alkalinity. Likewise, this system may be used to treat water having intimate contact with ash, such as ash pond water or ash-sluicing water from coal fired steam-electric power plants. In our evaporation process, a significant amount of reusable water can usually be obtained by our method of evaporation pretreatment and operation, unlike the case with conventional evaporative systems.

Another advantage, since an evaporator system when operated as described herein will not be subject to scaling or fouling conditions, wastewaters from refineries, hydrocarbon recovery operations, pulping and papermaking operations, membrane concentration systems, and municipal sewage treatment plants, are candidates as suppliers of raw water 20. Typical industrial uses where water of sufficient quality may be attained when treating wastewaters include cooling towers, boiler makeup, scrubber makeup, and the like.

Benefits of HEVAP Evaporation Process Design and Operation

Many exemplary and desirable process benefits provided by the HEVAP evaporation system process design and operation were listed above. Detailed explanation of such benefits include:

(A) High solubility of silica

It has been documented by others that silica solubility in water at 25° C. approaches 6000 milligram per liter (mg/l) at a pH of 11 and at a pH of 12, the solubility approaches 60,000 mg/l when in equilibrium with amorphous silica. It has also been documented that the solubility of silica in water goes up with an increase in temperature leading to the conclusion that evaporator operation at temperatures in excess of 100°C. at an elevated pH and silica levels up to 6000 mg/l is feasible. However, this is only possible if precipitating species such as calcium and magnesium and the like have been removed from the feed stream so that they cannot encourage the polymerization of silica and subsequent scaling on the heat transfer surface. The novel process disclosed herein wherein an aggressive approach to multi-valent cation and alkalinity removal is practiced, allows operation at much higher levels of silica concentration than were previously possible in normal evaporators. Since the high pH utilized by this novel process assures increased silica solubility, a concentration factor (i.e., ratio of feed rate 34 to blowdown rate 47) for the evaporator 40 can be selected so that silica solubility is not exceeded.

(B) High Recovery Rates

Since multi-valent ions such as calcium, magnesium, barium, strontium, aluminum, iron, manganese, etc., have been removed prior to concentration in the evaporator, undesirable precipitation of species such as calcium carbonate, calcium fluoride, calcium sulfate, barium sulfate, magnesium hydroxide, aluminum/magnesium silicate, etc., does not occur in the high efficiency evaporator process, and thus that type of precipitation no longer limits the recovery achievable by an evaporator system. Importantly, silica solubility is increased dramatically at the normal high efficiency brand evaporator operating pH (preferably at approximately 11 or above). Since silica usually represents the ultimate limiting criterion, in terms of maximum allowable concentration in an evaporator system, increased silica solubility along with essentially total absence of species such as calcium, barium, etc., in the evaporator feed, will allow evaporator operation at very high recovery rates (98 to greater than 99 percent) with the vast majority of feed waters.

(C) Biological Fouling Eliminated

Most commonly occurring microbial species are completely lysed (physically destroyed by wall rupture) at the high operating pH. In fact, even virus, spores, and endotoxins are either destroyed or rendered incapable of reproduction/proliferation at very high pH levels. Saponification of lipids (fat) is expected to play a role in the process as well since fatty acids and their corresponding glycerides will form soluble 'soaps' at the high operating pH. This characteristic of the new process can be of significant benefit for sites with known biofouling problems or for the treatment of bio-contaminated/bio-active wastewater.

(D) Cleaning Frequency Reduced

The HEVAP process, which utilizes aggressive removal of multi-valent cations and alkalinity along with a high pH in the evaporator, lengthens the time between shutdowns to clean the equipment. Typically, two weeks per year are used to clean heat transfer surfaces and sumps by opening them up to allow access for expensive high pressure hydro-blasting procedures to remove the bulk scaling material. This is then followed by time-consuming washes with costly proprietary chemicals to remove any scale not removed by hydro blasting.

In contrast, the HEVAP process, by removing essentially all minimal solubility ions and alkalinity, incurs only minimal scaling due to small leakage from the softeners used. The result of this is that cleaning intervals can be extended and that they can be simply and effectively accomplished by commodity cleaning chemicals, such as hydrochloric acid solutions, tetra-sodium EDTA, and sodium hydroxide. Expensive proprietary chemical cleaning agents are not required. The scales that could occur would be predominantly calcium carbonate, magnesium hydroxide, magnesium silicate, and the like, all of which can be removed with a simple acid wash.

The increased system availability, with minimal scaling and virtually non-existent bio-fouling, is clearly another important benefit of this novel operational method.

(E) Scale Inhibitors

The use of antiscalants, scale dispersants, scale inhibitors, or scale control methods, while not harmful or incompatible with the new process, can be minimized, if not completely eliminated, due to the aggressive removal of multi-valent cations along with virtually all non-hydroxide alkalinity as practiced by the HEVAP pretreatment process.

(F) Higher Flux

Present day state of the art evaporators are heat flux (flow) limited due to the presence of low solubility scale causing ions such as calcium carbonate, calcium sulfate, silica and the like. A higher flux can be incorporated into the evaporator design when these ions are absent in the feed stream and that is what is accomplished with the process described herein.

(G) Reduced Capital Cost

The lowered corrosion potential that results from operating the evaporator with a high pH in the concentrated circulating solution allows the use of lower cost materials for heat transfer tubes or plates and other wetted surfaces that are contacted by the concentrated solution, such as sump walls. This is an important advantage since the costs of these materials have a substantial impact on the capital cost of an evaporator. In most cases the use of high cost duplex and AL6XN (6 percent minimum molybdenum) type stainless steels, which are normally used in high chloride salt solutions, can be eliminated in favor of a lower grade stainless such as 316.

(H) Reduced Operating Cost

Water plant operating costs can be reduced due to minimizing, or eliminating, costly proprietary antiscalants and/or dispersants. Additional savings can be found by eliminating the need for seeded slurry operation at installations where the multi-valent ions are at a low level in the feed stream but are accompanied by high silica levels. Along with the cost of seeding the evaporator with calcium sulfate crystals, there is also incurred costs associated with calcium chloride and/or sodium sulfate injected chemicals to provide enough precipitating ions to maintain the seed bed at many installations. Further savings can be realized by the reduction in frequency of cleaning operations, less expensive cleaning chemicals, less downtime for cleaning, and no requirement for costly physical cleaning operations. Still further, if the ZLD option is incorporated, the cost of sending the blowdown to a public utility company is eliminated.

It will thus be seen that the objects set forth above, including those made apparent from the preceding description, are efficiently attained, and, since certain changes may be made in carrying out the above method and in construction of a suitable apparatus in which to practice the method and in which to produce the desired product as set forth herein, it is to be understood that the invention may be embodied in other specific forms without departing from the spirit or essential characteristics thereof. For example, while we have set forth an exemplary design for simultaneous hardness and alkalinity removal, other embodiments are also feasible to attain the result of the principles of the method disclosed herein. Therefore, it will be understood that the foregoing description of representative embodiments of the invention have been presented only for purposes of illustration and for providing an understanding of the invention, and it is not intended to be exhaustive or restrictive, or to limit the invention to the precise forms disclosed. On the contrary, the intention is to cover all modifications, equivalents, and alternatives falling within the spirit and scope of the invention as expressed in the appended claims. As such, the claims are intended to cover the methods and structures described therein, and not only the equivalents or structural equivalents thereof, but also equivalent structures or methods. Thus, the scope of the invention, as indicated by the appended claims, is intended to include variations from the embodiments provided which are nevertheless described by the broad meaning and range properly afforded to the language of the claims, or to the equivalents thereof.

We claim:

1. A process for treatment of a silica-containing aqueous feed water stream using an evaporator, said process comprising:
   (a) providing a feed water stream containing soluble and insoluble inorganic and organic species therein, said species comprising:
      (I) multi-valent metal cations,
      (II) alkalinity,
      (III) at least one molecular species which is at low ionization levels when in solution at around neutral pH, said molecular species comprises silica ($SiO_2$), meta-silicic acid ($H_2SiO_3$), or orthosilicic acid ($H_4SiO_4$);
   (b) removing a portion or substantially all multi-valent metal cations from said feed water stream to a non-precipitating residual level by passing said feed water stream through membrane softening equipment, or by increasing the pH to at least 10 in said feed water stream and passing the pH adjusted stream through membrane separation equipment to filter out hardness precipitate, and thereafter passing said feed water stream through a cation ion exchange system, and
   (c) processing the feed water stream by:
      (I) removing substantially all non-hydroxide alkalinity from said feed water stream; and
      (II) raising the pH thereof to at least 9 or higher;
   (d) after removing multi-valent metal ions, removing substantially all non-hydroxide alkalinity, and raising the pH of said feed water stream to at least 9 or higher, thereafter feeding the feed water stream having a pH of at least 9 or higher into an evaporator, wherein said evaporator:
      (I) contains a plurality of heat transfer surfaces,
      (II) contains a circulating high solids solution, and
      (III) wherein the pH of said circulating solution is maintained to at least 9, or higher; and
   (e) condensing the vapor produced by the evaporator to produce a distillate stream, the evaporator also producing a high solids containing blowdown stream.

2. The process as set forth in claim 1, wherein the step of said multi-valent metal cation removal is accomplished in a weak acid cation ion exchange system operated in a hydrogen form.

3. The process as set forth in claim 1, wherein the step of said multi-valent metal cation removal is accomplished in a weak acid cation ion exchange system that is operated in a sodium form.

4. The process as set forth in claim 1, wherein said feed water stream contains more multi-valent metal cations than alkalinity, and further comprising, before feeding said feed water stream to said cation ion exchange system, the step of adjusting the ratio of multi-valent metal cations to alkalinity by adding a base to said feed water stream, so as to raise the alkalinity of said feed water stream.

5. The process as set forth in claim 1, wherein said feed water stream contains more alkalinity than multi-valent metal cations, and further comprising, before feeding said feed water stream to said cation ion exchange system, the step of addition of acid to said feed water stream, so as to remove the excess alkalinity in said feed water stream.

6. The process as set forth in claim 1, wherein the step of multi-valent metal cation removal is accomplished by passing said feed water stream through a sodium form strong acid cation ion exchange system.

7. The process as set forth in claim 1, wherein after removing substantially all non-hydroxide alkalinity from said feed water stream dissolved gas is removed from said feed water stream.

8. The process according to claim 1, wherein said evaporator is falling thin film evaporation equipment operating as a single unit or in series or parallel, or forced circulation evaporation equipment which operates as a single unit or in parallel, or natural circulation evaporation equipment which operates as a single unit or in parallel, to generate said distillate stream and said high solids blowdown stream.

9. The process as set forth in claim 8, wherein said evaporator is operated in a steam driven multiple effect mode, or a mechanical vapor recompression mode, or a thermal compression mode, or as a multiple stage flash evaporator.

10. The process as set forth in claim 1, further comprising heating said feed water stream to enhance gas removal in a degasifier prior to entering said evaporator.

11. The process according to claim 1, wherein the step of raising the pH is accomplished by addition of a base in aqueous solution, said base selected from the group consisting of sodium hydroxide, sodium carbonate, potassium hydroxide, and potassium carbonate.

12. The process according to claim 1, wherein the step of raising the pH is accomplished by addition of an aqueous organic base.

13. The process according to claim 1, wherein said feed water stream is cooling tower blowdown, scrubber blowdown, water utilized in ash transport in a coal fired steam-electric power plant, ash pond water, ash-sluicing water, effluent from sewage treatment, effluent from a food processing treatment, boiler blowdown, a concentrated stream from membrane separation equipment, effluent from oil refining operations, or effluents from hydrocarbon recovery operations.

14. The process as set forth in claim 1, further comprising, during the step of removing alkalinity, the additional step of removing substantially all non-hydroxide alkalinity not associated with hardness.

15. The process as set forth in claim 1, wherein after step (c) (II) and prior to step (d), the process further comprises the step of removing dissolved gas in a degasifier.

* * * * *